United States Patent
Tanaka

(10) Patent No.: US 10,632,987 B2
(45) Date of Patent: Apr. 28, 2020

(54) DRIVING DEVICE OF VEHICLE

(71) Applicant: Honda Motor Co.,Ltd., Tokyo (JP)

(72) Inventor: Shuhei Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/240,798

(22) Filed: Jan. 7, 2019

(65) Prior Publication Data

US 2019/0210589 A1     Jul. 11, 2019

(30) Foreign Application Priority Data

Jan. 9, 2018    (JP) ................................ 2018-001524

(51) Int. Cl.
| | |
|---|---|
| *B60W 20/14* | (2016.01) |
| *B60W 10/08* | (2006.01) |
| *B60W 10/115* | (2012.01) |
| *B60W 10/196* | (2012.01) |

(52) U.S. Cl.
CPC ............ *B60W 20/14* (2016.01); *B60W 10/08* (2013.01); *B60W 10/115* (2013.01); *B60W 10/196* (2013.01); *B60W 2510/244* (2013.01); *B60W 2710/18* (2013.01)

(58) Field of Classification Search
CPC .. B60W 20/14; B60W 10/196; B60W 10/115; B60W 10/08; B60W 2710/18; B60W 2510/244
See application file for complete search history.

(56) References Cited

U.S. PATENT DOCUMENTS

| | | | | |
|---|---|---|---|---|
| 7,018,319 | B2 * | 3/2006 | Ziemer ..................... | F16H 3/66 475/271 |
| 2007/0202982 | A1 * | 8/2007 | Gumpoltsberger ....... | F16H 3/66 475/275 |
| 2007/0202984 | A1 * | 8/2007 | Gumpoltsberger ....... | F16H 3/66 475/323 |
| 2007/0202987 | A1 * | 8/2007 | Kakinami ................ | B60K 6/40 477/3 |

(Continued)

FOREIGN PATENT DOCUMENTS

| | | |
|---|---|---|
| JP | 2011102639 | 5/2011 |
| JP | 2013148117 | 8/2013 |

(Continued)

OTHER PUBLICATIONS

Office Action of Japan Counterpart Application, with English translation thereof, dated Jun. 25, 2019, pp. 1-5.

*Primary Examiner* — Erez Gurari
(74) *Attorney, Agent, or Firm* — JCIPRNET

(57) ABSTRACT

The disclosure provides a driving device of a vehicle, wherein even if a power storage device is fully charged, the driving device is capable of applying a corresponding decelerating force to a driving wheel. The driving device of the vehicle includes a motor as a driving source, a first planetary gear mechanism connected to the motor, a second planetary gear mechanism connected to the first planetary gear mechanism, and a differential mechanism connected with driving wheels from the second planetary gear mechanism, and further includes a brake detachably connecting a ring gear of the second planetary gear mechanism to a fixed-side member, and a lock mechanism capable of locking the differential mechanism.

4 Claims, 4 Drawing Sheets

(56) References Cited

U.S. PATENT DOCUMENTS

2008/0093137 A1\* 4/2008 Maeda .................... B60K 6/40
                                                180/65.265
2016/0238110 A1\* 8/2016 Morrow ................ B60K 6/387
2019/0210589 A1\* 7/2019 Tanaka ................. B60W 10/08

FOREIGN PATENT DOCUMENTS

| JP | 2014509281 | 4/2014 |
| JP | 2017202723 | 11/2017 |
| JP | 2017218037 | 12/2017 |

\* cited by examiner

DRIVING DEVICE OF VEHICLE

CROSS-REFERENCE TO RELATED APPLICATION

This application claims the priority benefit of Japan Application No. 2018-001524, filed on Jan. 9, 2018. The entirety of the above-mentioned patent application is hereby incorporated by reference herein and made a part of this specification.

BACKGROUND

Technical Field

The disclosure relates to a driving device of a vehicle.

Description of Related Art

Considering various problems related to global warming and fossil fuels, in addition to cars using an internal combustion engine as a driving source, such as a gasoline car or a diesel car, various types of cars are being developed (e.g., see Patent Document 1). Among these cars, electric vehicles (EVs) that emit no greenhouse gases and are excellent in simplification of internal structure, high traveling performance, low noise and the like are in development. The EVs only use a motor as a driving source. In such an EV, a driving device transmitting output from the motor to an axle and using the output as a driving force of the vehicle is provided. This type of driving device is, for example, disclosed in the technique described in Patent Document 2.

The technique described in Patent Document 2 includes a configuration including: a motor having a hollow cylindrical output shaft; a speed reducer to which a driving force from the output shaft of the motor is input; and a power transmission mechanism (differential gear) distributing and transmitting the driving force decelerated by the speed reducer to left and right axles, wherein the motor, the speed reducer and the power transmission mechanism are disposed coaxially with each other, and the axles to which the output from the power transmission mechanism is transmitted pass through inside of the output shaft of the motor. The technique described in Patent Document 2 is capable of compacting outer dimensions of the driving device by having the above configuration, and it is possible to achieve miniaturization and weight reduction of the driving device.

PATENT DOCUMENT(S)

Incidentally, the motor mounted on a hybrid electric vehicle (HEV) as described in Patent Document 1 or an EV as described in Patent Document 2 also functions as, for example, a generator with a rotor rotating by power transmitted from the outside. When the rotor of the motor rotates to generate electricity, a predetermined rotational resistance is applied to the rotor. In the HEV or EV, a decelerating force (regenerative torque) can be applied to a driving wheel of the vehicle by using the rotational resistance.

However, in a case (hereinafter referred to as "charge limit state") where further charging is restricted for a reason such as that a power storage device connected to the motor is fully charged or almost fully charged, the electricity generated by the motor may become surplus power, and the regenerative torque cannot function effectively. Accordingly, if the vehicle travels downhill in the aforementioned charge limit state, sufficient decelerating force may not be applied from the motor to the driving wheel. In the case of the HEV, since the HEV includes two driving sources, i.e., the engine (internal combustion engine) and the motor, even when performing downhill traveling, brake force of the engine can be used; however, in the case of the EV, such an alternative is not available since the only driving source is the motor. The aforementioned problem in the charge limit state is not taken into account in the technique described in Patent Document 2.

[Patent Document 1] Japanese Translation of PCT International Application Publication No. 2014-509281
[Patent Document 2] Japanese Laid-open No. 2011-102639

SUMMARY

The disclosure provides a driving device of a vehicle, wherein even in a case where a power storage device is in the charge limit state, the driving device is capable of applying a corresponding decelerating force (regenerative torque) to a driving wheel.

A driving device (1) of a vehicle according to the disclosure includes a motor (M) as a driving source, a first planetary gear mechanism (PG1) connected to the motor (M), a second planetary gear mechanism (PG2) connected to the first planetary gear mechanism (PG1), and a power transmission member (20) connected with a driving wheel (W1 and W2) from the second planetary gear mechanism (PG2), and includes a brake (BR) detachably connecting a ring gear (R1) of the first planetary gear mechanism (PG1) or a ring gear (R2) of the second planetary gear mechanism (PG2) to a fixed-side member (10), and a lock mechanism (PL) capable of locking the power transmission member (20).

Figure 2:
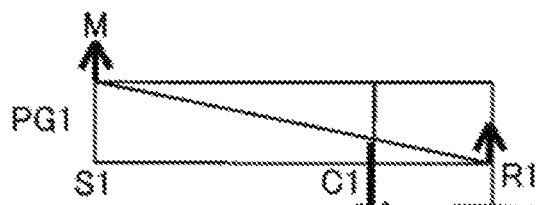
Figure 2:
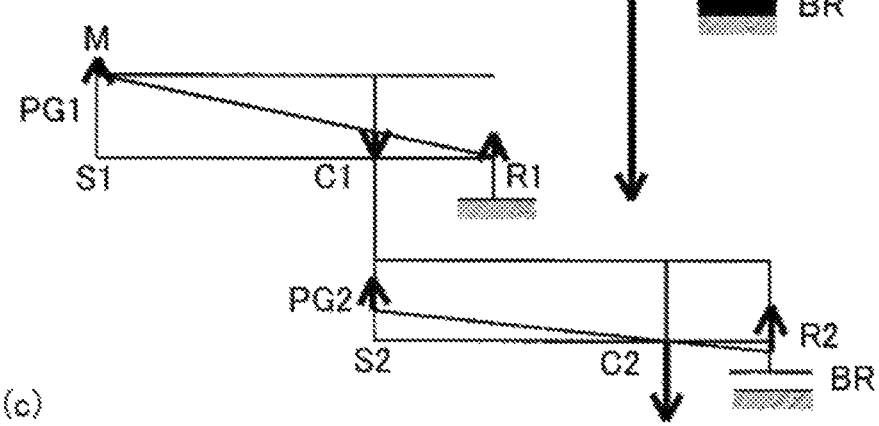
Figure 2:
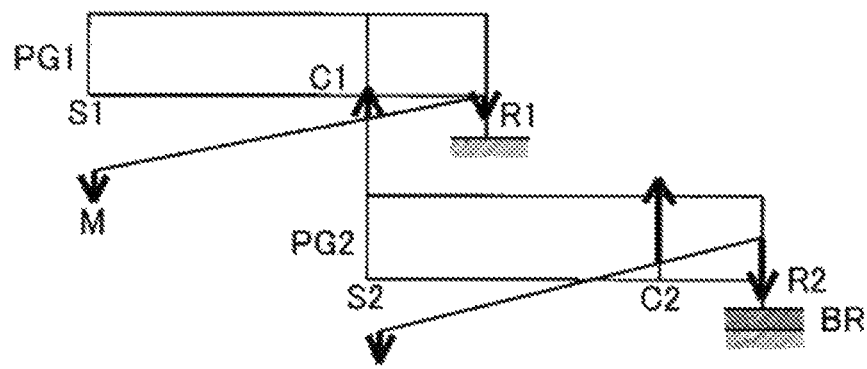

(a) to (c) of FIG. 2 are velocity diagrams of the driving device of the vehicle.

Figure 3:
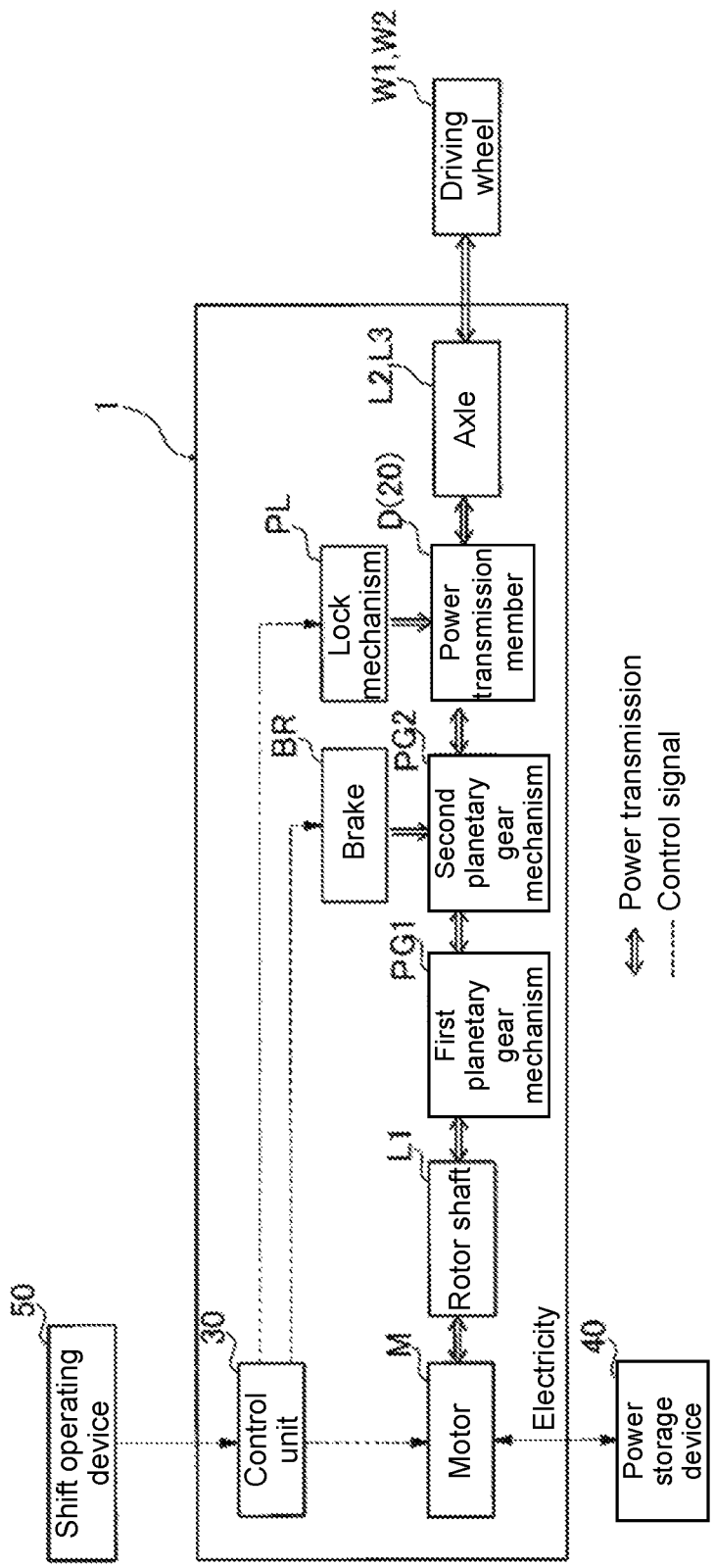

FIG. 3 is a block diagram showing a functional configuration of the driving device of the vehicle.

Figure 4:
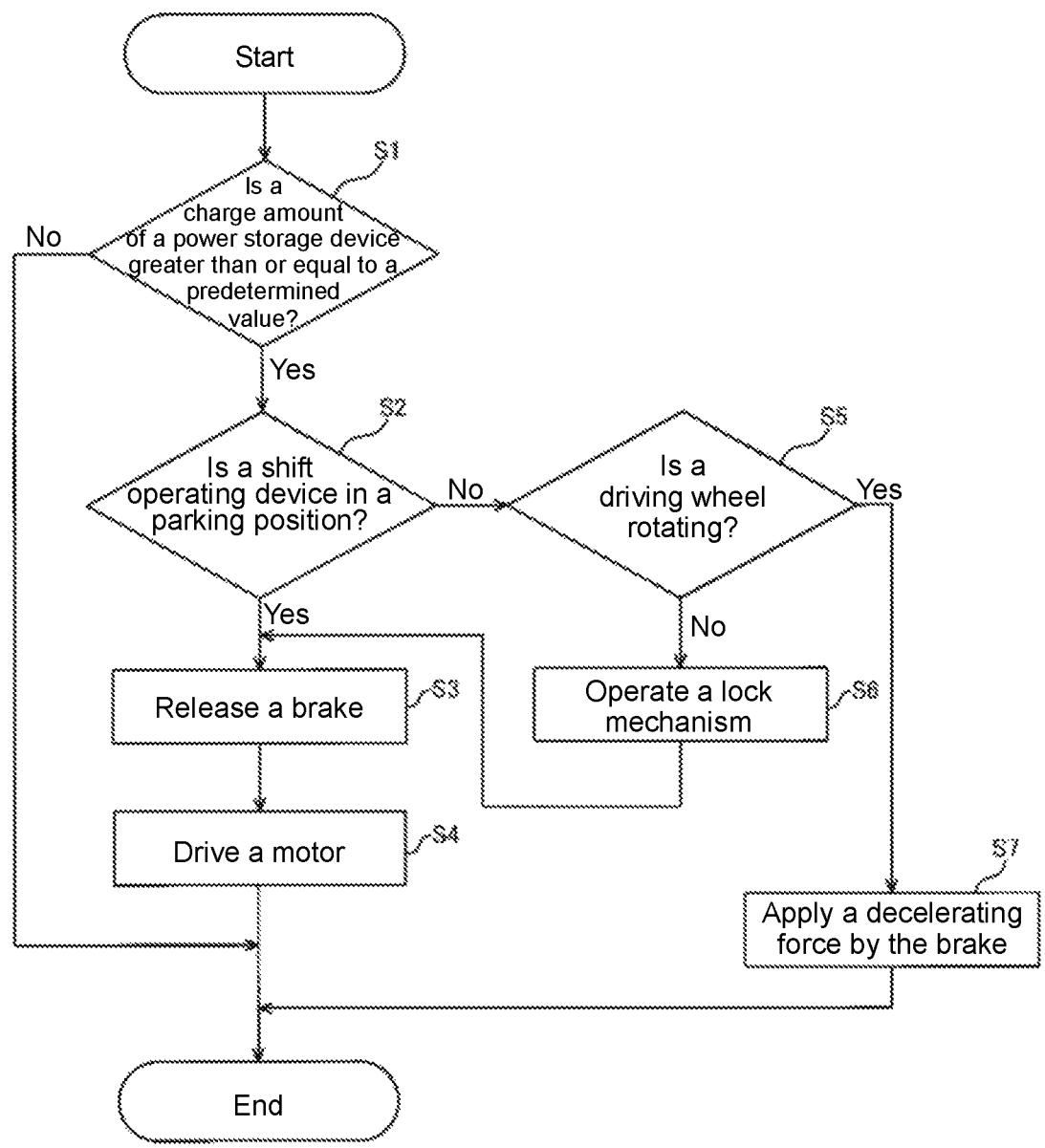

FIG. 4 is a flowchart showing an example of controlling the driving device of the vehicle.

DESCRIPTION OF THE EMBODIMENTS

A driving device (1) of a vehicle according to the disclosure includes a motor (M) as a driving source, a first planetary gear mechanism (PG1) connected to the motor (M), a second planetary gear mechanism (PG2) connected to the first planetary gear mechanism (PG1), and a power transmission member (20) connected with a driving wheel (W1 and W2) from the second planetary gear mechanism (PG2), and includes a brake (BR) detachably connecting a ring gear (R1) of the first planetary gear mechanism (PG1) or a ring gear (R2) of the second planetary gear mechanism (PG2) to a fixed-side member (10), and a lock mechanism (PL) capable of locking the power transmission member (20).

According to an embodiment, in the driving device (1) of the vehicle according to the disclosure, a rotating shaft (L1) of the motor (M) is connected to a sun gear (S1) of the first planetary gear mechanism (PG1), a carrier (C1) of the first planetary gear mechanism (PG1) is connected to a sun gear (S2) of the second planetary gear mechanism (PG2), and a carrier (C2) of the second planetary gear mechanism (PG2) is connected to the power transmission member (20).

According to an embodiment, the driving device (1) of the vehicle according to the disclosure further includes a power storage device (40) capable of exchanging electricity with the motor (M), and a control unit (30) that controls at least the motor (M), the brake (BR), and the lock mechanism (PL). Furthermore, the control unit (30) determines whether or not a charge amount of the power storage device (40) is greater than or equal to a predetermined value, and if determining that the charge amount is greater than or equal to the predetermined value, determines whether or not the driving wheel (W1 and W2) is rotating, wherein if determining that the driving wheel (W1 and W2) is not rotating, the control unit (30) controls the lock mechanism (PL) so as to lock the power transmission member (20), and controls the brake (BR) so as to release the connection between the ring gear (R2) of the second planetary gear mechanism (PG2) and the fixed-side member (10) and further performs control so as to drive the motor (M), and if determining that the driving wheel (W1 and W2) is rotating, the control unit (30) controls the brake (BR) so as to brake the ring gear (R2).

According to an embodiment, in the driving device (1) of the vehicle according to the disclosure, the control unit (30) determines whether or not a shift operating device (50) is in a parking position, and if determining that the shift operating device (50) is in the parking position, controls the brake (BR) so as to release the connection between the ring gear (R2) and the fixed-side member (10), and performs control so as to drive the motor (M).

According to the driving device of the vehicle according to the disclosure, during stop of the vehicle traveling downhill, it is possible to idle the motor by locking the power transmission member by the lock mechanism. Accordingly, it is possible to consume electricity of the power storage device without driving the driving wheel. As a result, the power storage device can return to a state capable of being supplied with electricity generated by the motor, and sufficient decelerating force (regenerative torque) of the motor can be applied to the driving wheel.

In addition, according to the driving device of the vehicle according to the disclosure, during downhill travel, it is possible to decelerate or stop rotation of the ring gear of the second planetary gear mechanism by braking using the brake. Accordingly, even if the power storage device is in the charge limit state, sufficient decelerating force can be applied to the driving wheel.

Hereinafter, embodiments of the disclosure are described in detail with reference to the drawings. However, the disclosure can be implemented in many different modes and is not to be construed as being limited to the content described in the embodiments shown below.

Figure 1:
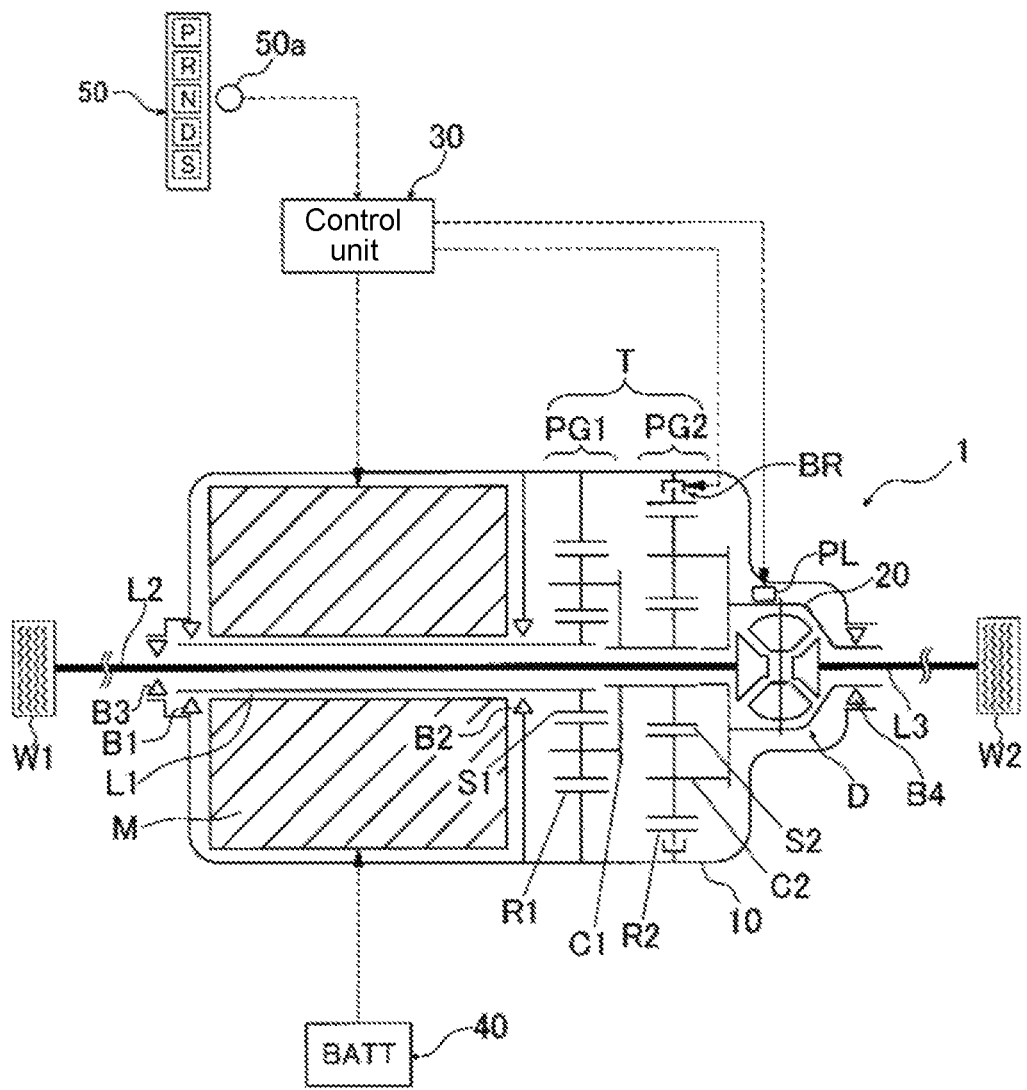
FIG. 1 illustrates a configuration of a driving device of a vehicle according to an embodiment of the disclosure.

First, a driving device 1 of a vehicle according to an embodiment of the disclosure is explained with reference to FIG. 1. FIG. 1 is a skeleton diagram showing a configuration of the driving device 1 of the vehicle. The driving device 1 of the vehicle shown of FIG. 1 is a driving device for an EV having only a motor (an electric motor or motor generator) M as a driving source, and includes the motor M having a hollow cylindrical rotor shaft (output shaft) L1, a speed reducer T for decelerating rotation of the motor M, and a differential mechanism (power transmission member) D for distributing and transmitting output from the speed reducer T to a left axle L2 and a right axle L3. The motor M, the speed reducer T and the differential mechanism D are disposed coaxially. In addition, the motor M, the speed reducer T, the differential mechanism D, and the axles L2 and L3 are accommodated in a case 10. The motor M is connected to a power storage device (e.g., a lithium ion secondary battery) 40 that exchanges electricity with the motor M.

The axle L2 is connected to a gear case (power transmission member) 20 of the differential mechanism D and disposed to pass through inside of the rotor shaft L1. Further, a tip of the axle L2 is connected to a driving wheel W1. Likewise, the axle L3 is connected to the differential mechanism D. A tip of the axle L3 is connected to a driving wheel W2.

The speed reducer T includes two planetary gear mechanisms (planetary gear sets) involving a first planetary gear mechanism PG1 and a second planetary gear mechanism PG2 disposed coaxially with each other. A ring gear R1 of the first planetary gear mechanism PG1 and the second planetary gear mechanism PG2 are both single pinion type planetary gear mechanisms. The first planetary gear mechanism PG1 disposed on the side of the motor M includes a sun gear S1, a carrier C1 and the ring gear R1. Similarly, the second planetary gear mechanism PG2 disposed on the side of the differential mechanism D includes a sun gear S2, a carrier C2 and a ring gear R2.

As shown in FIG. 1, the sun gear S1 of the first planetary gear mechanism PG1 is connected to the rotor shaft L1 of the motor M, and the carrier C1 of the first planetary gear mechanism PG1 is connected to the sun gear S2 of the second planetary gear mechanism PG2. The carrier C2 of the second planetary gear mechanism PG2 is formed integrally with a gear case 20 of the differential mechanism D. In addition, the ring gear R1 of the first planetary gear mechanism PG1 is fixed to a case (fixed-side member) 10. By contrast, the ring gear R2 of the second planetary gear mechanism PG2 is detachably connected to the case 10 via a brake BR that is described later.

Reference signs B1 and B2 shown in FIG. 1 denote bearings which support the rotor shaft L1. In addition, reference sign B3 denotes a bearing which supports one end of the axle L2. Furthermore, reference sign B4 denotes a bearing (a support bearing of the gear case 20) which supports a side part of the differential mechanism D.

In addition, the driving device 1 of the vehicle according to the disclosure further includes a control unit 30 capable of controlling at least the motor M, the brake BR and a lock mechanism PL. The control unit 30 is not particularly limited as long as it can calculate a signal received from various sensors and transmit a control signal to the motor M and the like. Examples of the control unit 30 include an arithmetic unit such as an ECU, etc.

In addition, the vehicle of the present embodiment includes a shift operating device 50 operated by a driver through a shift lever (not shown). Positions of the shift lever in the shift operating device 50 include, for example, P (parking), R (backward traveling), N (neutral), D (forward traveling in an automatic shift mode (normal mode)), S (forward traveling in a sport mode) and the like, as shown in FIG. 1. A shift position sensor 50a is provided in the vicinity of the shift operating device 50. The shift position sensor 50a detects the position (shift position) of the shift lever selected by operating the shift operating device 50. Information of the shift position detected by the shift position sensor 50a is input to the control unit 30.

The driving device 1 of the vehicle according to the present embodiment includes the brake (braking mechanism) BR detachably connecting the ring gear R2 of the second planetary gear mechanism PG2 to the case 10. The brake BR is formed of a friction engagement mechanism and the like, and can switch the ring gear R2 to any of a rotation prohibiting state (completely engaged state), a rotation allowance state (completely released state) in which no brake force (resistance) is applied, and a rotation allowance state (half-released state or dragged state) in which a brake force (resistance) is applied. In addition, in the rotation allowance state in which the brake force (resistance) is applied, it is possible to arbitrarily adjust the brake force applied to the ring gear R2 by adjusting (controlling) an engagement amount of the brake BR.

Depending on the magnitude of the brake force of the brake BR with respect to the ring gear R2, it is possible to slide the ring gear R2 with respect to the brake BR (that is, to decelerate rotation of the ring gear R2) or to stop the ring gear R2. The situation where the ring gear R2 stops rotating by the action of the brake BR is equivalent to a situation where the ring gear R2 is fixed to the case 10. By providing the brake BR like this, even if the power storage device 40 that exchanges electricity with the motor M is in the charge limit state, it is possible to, for example, apply a brake force to the ring gear R2 and reduce or stop rotation of the ring gear R2. As a result, a decelerating torque is exerted on the carrier C2, the differential mechanism D connected to the carrier C2, and the axles L2 and L3. Accordingly, it is possible to brake the driving wheels W1 and W2.

Furthermore, the driving device 1 of the vehicle according to the present embodiment includes the lock mechanism (parking lock mechanism) PL capable of locking (preventing) rotation of the gear case 20 of the differential mechanism D. As shown in FIG. 1, the lock mechanism PL in the present embodiment can lock, for example, the gear case 20 accommodating the differential mechanism D. The gear case 20 and the differential mechanism D rotate in conjunction with each other. Therefore, by the lock mechanism PL, as rotation of the gear case 20 is locked, rotation of the differential mechanism D is locked. By locking the differential mechanism D, the carrier C2 of the second planetary gear mechanism PG2 is fixed, and a state is formed in which even if the rotor shaft L1 is rotated by the output from the motor M, the axles L2 and L3 do not rotate (neither do the driving wheels W1 and W2).

That is, when rotation of the differential mechanism D is locked by the locking mechanism PL, it is possible to idle the motor M without rotating the axles L2 and L3 (the driving wheels W1 and W2). Accordingly, electricity of the power storage device 40 in the charge limit state can be consumed, and an effective regenerative torque (decelerating force) can be applied to the driving wheels W1 and W2. For example, when the vehicle stops during a downhill travel, or the like, if the lock mechanism PL is set to a locking state, once the vehicle resumes traveling, the power storage device 40 returns to a chargeable state and sufficient decelerating force can be applied to the driving wheels W1 and W2.

Next, an operation example of the driving device 1 of the vehicle according to the present embodiment is explained with reference to (a) to (c) of FIG. 2. (a) to (c) of FIG. 2 are velocity diagrams of the first planetary gear mechanism PG1 and the second planetary gear mechanism PG2 that are included in the driving device 1 of the vehicle. Here, (a) of FIG. 2 is a velocity diagram of the driving device 1 of the vehicle in a state in which the power storage device 40 is chargeable (normal state). In addition, (b) of FIG. 2 is a velocity diagram of the driving device 1 of the vehicle in a case where the power storage device 40 is in the charge limit state and the vehicle has stopped traveling (traveling stop state). Further, (c) of FIG. 2 is a velocity diagram of the driving device 1 of the vehicle in a case where the power storage device 40 is in the charge limit state and the vehicle is traveling downhill (downhill traveling state).

Operation in Normal State

As shown in (a) of FIG. 2, in the driving device 1 of the vehicle in the normal state, the ring gear R2 of the second planetary gear mechanism PG2 is fixed to the case 10 since the brake BR is in the completely engaged state. In this state, output from the carrier C2 connected with the differential mechanism D is input to the carrier C1 of the first planetary gear mechanism PG1 via the sun gear S2. Since the ring gear R1 of the first planetary gear mechanism PG1 is fixed to the case 10, a driving force input to the carrier C1 is input to the motor M via the sun gear S1. As described above, since the power storage device 40 can be charged with the electricity generated by the motor (generator) M, when the driving force is input from the sun gear S1 to the motor M, regenerative torque is generated in the motor M. As a result, rotation of the driving wheels W1 and W2 is effectively decelerated.

Operation in Traveling Stop State

In the driving device 1 of the vehicle in the traveling stop state, the differential mechanism D is locked by the lock mechanism PL. Accordingly, as shown in (b) of FIG. 2, the carrier C2 of the second planetary gear mechanism PG2 is fixed. After the differential mechanism D is locked, the motor M is rotated. As shown in (b) of FIG. 2, even if the output from the motor M is transmitted to the second planetary gear mechanism PG2 via the carrier C1 of the first planetary gear mechanism PG1, since the carrier C2 connected with the differential mechanism D is fixed, only the sun gear S2 and the ring gear R2 rotate. That is, rotation of the motor M is not transmitted to the axles L2 and L3 (the driving wheels W1 and W2) by the differential mechanism D. Therefore, it is possible to idle the motor M. Accordingly, the electricity of the power storage device 40 can be consumed and the power storage device 40 can return to the chargeable state.

Moreover, at this time, the brake BR can be set to either the rotation allowance state (completely released state) in which no brake force (resistance) is applied or the rotation allowance state (dragged state) in which the brake force (resistance) is applied. If the brake BR is set to the dragged state, a load can be applied to the rotor shaft L1 of the motor M during idling, and therefore consumption of the electricity of the power storage device 40 by rotation of the motor M can further be promoted.

When the vehicle resumes traveling from the stop state, the lock of the differential mechanism D by the lock mechanism PL is released. In this case, the vehicle returns to the normal state described above. The output from the carrier C2 connected with the differential mechanism D is input to the motor M via the first planetary gear mechanism PG1. At this time, since the power storage device 40 has returned to the chargeable state, the regenerative torque is generated in the motor M and the rotation of the driving wheels W1 and W2 is decelerated.

Operation in Downhill Traveling State

As shown in (c) of FIG. 2, in the driving device 1 of the vehicle in the downhill traveling state, by setting the brake BR to the rotation allowance state (slip state) in which the brake force (resistance) is applied, the brake force is applied to the ring gear R2 of the second planetary gear mechanism PG2. Since the brake force is applied to the ring gear R2, the decelerating torque is exerted on the carrier C2 connected to the ring gear R2 and on the differential mechanism D, and the rotation of the driving wheels W1 and W2 is decelerated. Accordingly, the brake force can be applied to the vehicle traveling downhill.

Next, an example of drive control in the driving device 1 of the vehicle according to the present embodiment is explained with reference to FIGS. 3 and 4. FIG. 3 is a block diagram including the driving device 1 of the vehicle. In addition, FIG. 4 is a flowchart showing an example of controlling the driving device 1 of the vehicle. In FIG. 3, a control signal line is shown by a dashed arrow and a power transmission path is shown by a double-lined arrow.

Control of the driving device 1 of the vehicle performed by the control unit 30 is explained using FIG. 4. As shown in FIG. 4, the control unit 30, for example, receives a detection signal from a residual capacity sensor that detects a residual capacity of the power storage device 40, and determines whether or not a charge amount (residual capacity: state of charge (SoC)) of the power storage device 40 is greater than or equal to a predetermined value (whether or not the power storage device 40 is in the charge limit state) (step S1). A threshold value at this time can arbitrarily be set within a range in which effective regenerative torque can be exerted on the driving wheels W1 and W2.

In step S1, if the charge amount of the power storage device 40 is determined to be less than the threshold value (NO), it is determined that effective regenerative torque can be applied to the driving wheels W1 and W2, and control of the brake BR and the lock mechanism PL is not performed.

By contrast, in step S1, if the charge amount of the power storage device 40 is determined to be greater than or equal to the predetermined value (if it is determined that the power storage device 40 is in the charge limit state) (YES), the control unit 30, for example, determines whether or not the shift operating device 50 is in the parking position (P position) based on position information of the shift position sensor 50a (step S2).

In step S2, if it is determined that the shift position selected by the shift operating device 50 is the parking position (YES), the control unit 30 releases the brake BR (sets the brake BR to the rotation allowance state) to allow rotation of the ring gear R2 of the second planetary gear mechanism PG2 (step S3). Subsequently, the control unit 30 performs control so as to drive the motor M (step S4). Accordingly, the motor M can be idled and electricity stored in the power storage device 40 can be consumed. That is, the power storage device 40 is released from the charge limit state and effective regenerative torque can be applied to the driving wheels W1 and W2.

Afterwards, when the driver shifts the shift position of the shift operating device 50 to, for example, a driving position (D position) or the like in order to resume travel of the vehicle, the control unit 30 controls the brake BR so as to brake the ring gear R2. Accordingly, rotation of the driving wheels W1 and W2 can be decelerated.

By contrast, in step S2, if it is determined that the shift position of the shift operating device 50 is a position other than the parking position, for example, the driving position, the control unit 30 determines whether or not the driving wheels W1 and W2 are in a rotating state (that is, whether or not a wheel speed of the driving wheels W1 and W2 is 0 km/h) based on rotational speed information (wheel speed information) of the driving wheels W1 and W2 obtained from a wheel speed sensor or the like (step S5).

According to a result of the determination in step S5, if it is determined that the driving wheels W1 and W2 are not rotating (NO), the lock mechanism PL is controlled so as to lock the differential mechanism D (gear case 20) (step S6).

Subsequently, the control unit 30 releases the brake BR (sets the brake BR to the rotation allowance state) so as to allow rotation of the ring gear R2 of the second planetary gear mechanism PG2 (step S3), and performs control so as to drive the motor M (step S4). The subsequent control is the same as in the above case.

By contrast, in step S5, if it is determined that the driving wheels W1 and W2 are rotating (YES), the control unit 30 controls the brake BR so as to brake the ring gear R2 (step S7). Accordingly, sufficient decelerating force can be applied to the driving wheels W1 and W2.

As described above, the driving device 1 of the vehicle according to the present embodiment, while adopting a simple structure in which the brake BR braking the ring gear R2 of the second planetary gear mechanism PG2 and the lock mechanism PL locking the differential mechanism D are provided, is capable of solving the above-mentioned demerits of the EV with the power storage device 40 being in the charge limit state. That is, it is possible to provide the driving device 1 of the vehicle which, while maintaining a compact structure, is capable of applying an effective brake force to the driving wheels W1 and W2 even if the power storage device 40 is in the charge limit state.

An embodiment of the disclosure has been described above. However, the above description is for facilitating understanding of the disclosure and is not meant to limit the disclosure. The disclosure includes modifications and variations thereof that do not depart from the spirit of the disclosure. Also, the disclosure includes equivalents thereof.

For example, in the above embodiment, a case has been explained where the lock mechanism PL locks the gear case 20 of the differential mechanism D. However, if the lock mechanism of the disclosure can lock (prevent rotation of) components of the power transmission path between the second planetary gear mechanism PG2 and the driving wheels W1 and W2 of the vehicle so that rotation (power generated therefrom) of the rotor shaft L1 of the motor M can be prevented from being transmitted to the driving wheels W1 and W2, the lock mechanism of the disclosure can also be provided in other position (so as to prevent other members from rotating).

Further, in the above embodiment, a case has been explained where the brake BR that detachably connects the ring gear R2 of the second planetary gear mechanism PG2 to the case 10 is included. However, although not illustrated, it is also possible to provide, in place of the brake BR, a brake that detachably connects the ring gear R1 of the first planetary gear mechanism PG1 to the case 10. By the above brake provided at the ring gear R1 of the first planetary gear mechanism PG1, the same effects as above can be obtained.

What is claimed is:

1. A driving device of a vehicle, the driving device comprising:
   a motor as a driving source;
   a first planetary gear mechanism connected to the motor;
   a second planetary gear mechanism connected to the first planetary gear mechanism;
   a power transmission member connected with a driving wheel from the second planetary gear mechanism;
   a brake detachably connecting a ring gear of the first planetary gear mechanism or a ring gear of the second planetary gear mechanism to a fixed-side member; and
   a lock mechanism capable of locking the power transmission member,
   wherein the driving device further comprises:
   a power storage device capable of exchanging electricity with the motor; and a control unit controlling at least the motor, the brake and the lock mechanism, wherein the control unit
determines whether or not a charge amount of the power storage device is greater than or equal to a predetermined value, and
if determining that the charge amount is greater than or equal to the predetermined value, determines whether or not the driving wheel is rotating, wherein
if determining that the driving wheel is not rotating, the control unit controls the lock mechanism so as to lock the power transmission member and controls the brake so as to allow rotation of the ring gear of the second planetary gear mechanism, and further performs control so as to drive the motor, and
if determining that the driving wheel is rotating, the control unit controls the brake so as to allow rotation of the ring gear in a state in which a brake force is applied to the ring gear.

2. The driving device of the vehicle according to claim 1, wherein a rotating shaft of the motor is connected to a sun gear of the first planetary gear mechanism, a carrier of the first planetary gear mechanism is connected to a sun gear of the second planetary gear mechanism, and a carrier of the second planetary gear mechanism is connected to the power transmission member.

3. The driving device of the vehicle according to claim 2, wherein the control unit determines whether or not a shift position selected by a shift operating device is in a parking position, and, if determining that the shift position is the parking position, controls the brake so as to allow rotation of the ring gear and performs control so as to drive the motor.

4. The driving device of the vehicle according to claim 1, wherein the control unit determines whether or not a shift position selected by a shift operating device is in a parking position, and, if determining that the shift position is the parking position, controls the brake so as to allow rotation of the ring gear and performs control so as to drive the motor.

* * * * *